UNITED STATES PATENT OFFICE.

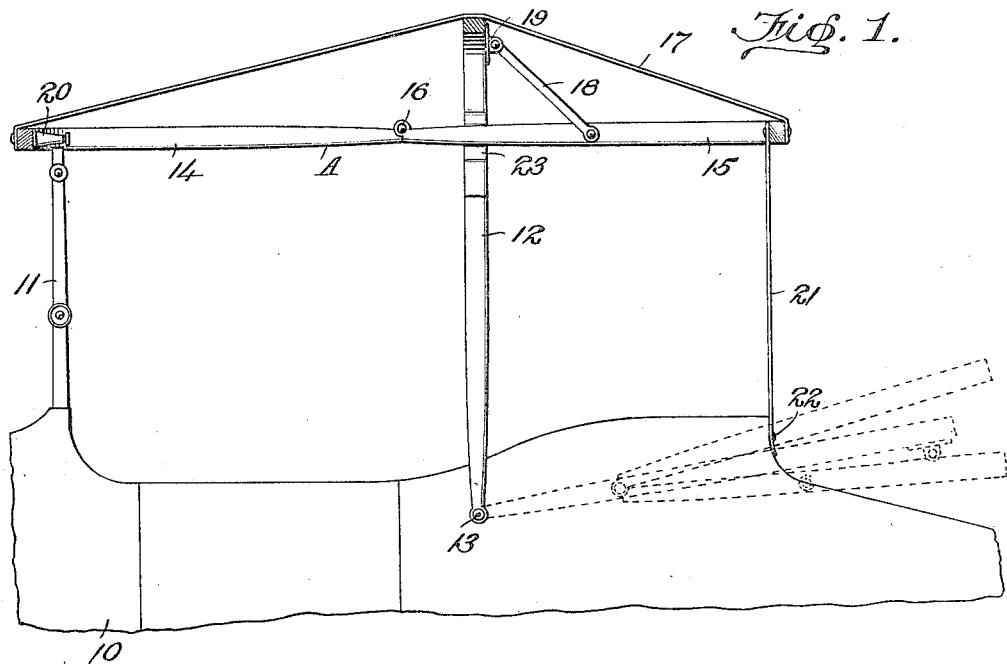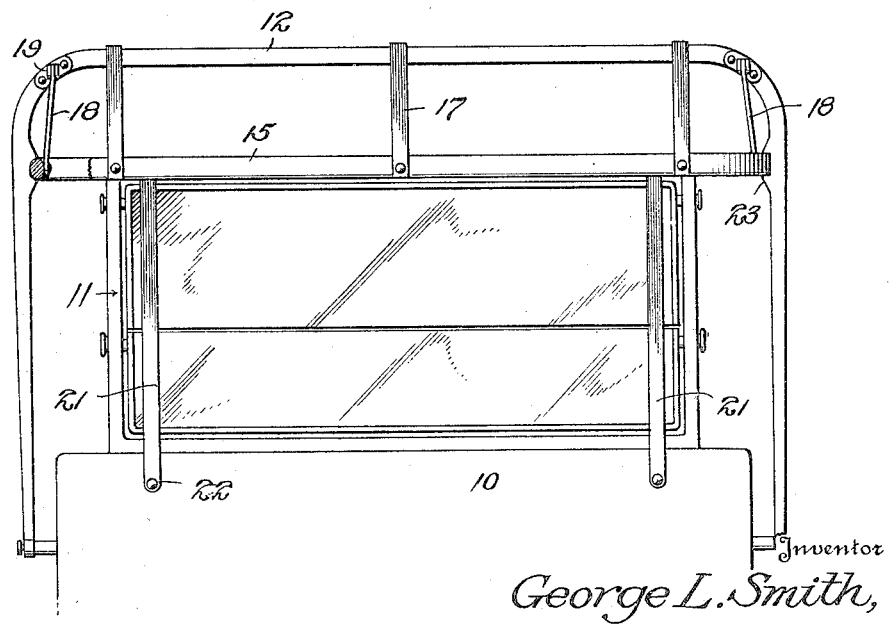

GEORGE L. SMITH, OF WASHINGTON, DISTRICT OF COLUMBIA.

COLLAPSIBLE TOP-FRAME FOR VEHICLES.

1,390,219.  Specification of Letters Patent.  Patented Sept. 6, 1921.

Application filed January 12, 1920. Serial No. 350,964.

*To all whom it may concern:*

Be it known that I, GEORGE L. SMITH, a citizen of the United States, residing at Washington, in the District of Columbia, have invented certain new and useful improvements in Collapsible Top-Frames for Vehicles; and I do hereby declare the following to be a full, clear, and exact description of the invention, such as will enable those skilled in the art to which it appertains to make and use the same.

My invention relates to collapsible top frames for vehicles and is particularly adapted for use in connection with vehicles of the automobile type, although not limited to such use.

It is my purpose to provide a collapsible top frame of this type which can be manipulated with relative ease to or from elevated position; which will be exceedingly simple in construction with corresponding advantages in manufacture and economy of production; and which will facilitate the use of side and rear curtains in that such curtains can all be easily attached and detached from the inside of the vehicle.

I will describe my invention in the best form known to me at present and as applied to an automobile of standard type, but it will be understood that the same is applicable to other types of automobiles and vehicles and that it is susceptible to changes in form and proportions and to desirable additions with the exercise of only ordinary mechanical skill and without departing from the spirit of the invention.

In describing my invention in detail I will refer to the accompanying drawing wherein like characters of reference denote corresponding parts in the different views, and in which—

Figure 1 is a side view of a fragment of an automobile with my improved top frame applied and partly broken away, the top frame being shown in full lines in elevated position and in dotted lines in collapsed position; and Fig. 2, a view of what is shown in Fig. 1 with certain portions of the frame broken away.

Referring now to the drawings 10 indicates the body of an automobile of standard type with which is associated the usual wind shield 11. My improved top frame comprises a supporting bow 12 which has its arms pivotally connected to opposite sides of the automobile body at 13 in the usual and well known manner. My improved top further embodies what I term a cover frame A which is formed of front and rear bows 14 and 15 respectively. Corresponding free ends of the arms of the bows 14 and 15 are pivotally connected as at 16 whereby the cover frame may be collapsed to the status shown in dotted lines in Fig. 1 and opened up to constitute a substantially rectangular frame as shown in full lines in Fig. 1. The bows 12, 14 and 15 are connected by flexible straps 17 so that when the frame is erected as shown in Fig. 1 they will be held in proper position with respect to each other. Each arm of the bow 15 has pivotally connected thereto one end of a link 18 and the other end of each link 18 is pivotally connected with the bow 12 through the medium of a bracket 19. In erected position the cover of the frame A extends loosely between the arms of the bow 12 in a plane substantially at right angles to the plane of said supporting bow and the bow 14 of the cover frame carries at its forward end the usual fastening devices 20 for association with the wind shield 11 in the usual and well known manner. Straps 21 are carried at the rear of the bow 15 and are adapted to be engaged with suitable fastening devices 22 on the automobile body 10 and the application of the straps 21 to the fastening devices 22 serves to hold down the bow 15 of the cover frame and place the straps 17 in tension and thus assure a taut condition and neat appearance of the top when erected. The links 18 serve to always hold the parts of the top together in proper relation for erection or collapse and in addition prevent rattling or vibration of the top when completely erected. As a further guard against vibration of the cover frame I provide on the inside faces of the arms of the bow 12 inwardly a chock 23 and containing a recess into which the arms of the bow 15 will spring and rest.

It will be noted that by disposing the cover frame loosely between the arms of the supporting bow 12 I afford a convenient support for the rear and side curtains which can be buttoned from the inside to the inside faces of the cover frame members. When all curtains are removed the top affords the necessary shade, but does not interfere in any way with the free circulation of air or a clear view in any direction.

It will be further noted that the construction of the frame is such that when it is collapsed as shown in dotted lines in Fig. 1 it can be secured with the usual bow holder provided on standard automobiles.

While I have described my invention as embodied in a collapsible vehicle top it will be apparent that the same can be readily incorporated in a fixed top and in which case the supporting bow would have a fixed connection with the vehicle body and the cover frame constructed rigidly.

I claim:

1. A vehicle top frame including a cover frame composed of forwardly and rearwardly extending bows pivotally connected together, supporting means pivotally connected to the rearwardly extending bow at a point spaced from the ends thereof, means connecting the forwardly extending bow to the vehicle body, and means connected to the rearwardly extending bow at a point to the rear of the pivotal connection of said supporting means and to the vehicle body, whereby downward tension of said means exerts a lifting action on the pivotal connection of the cover frame bows.

2. In a vehicle top frame, a supporting element, a cover frame extending across the supporting element without connection therewith and including pivotally connected sections, a member pivotally connected to the supporting element at a point disposed above the cover frame and to one of the cover frame sections at a point spaced from the ends thereof, means connecting the forward section of the cover frame to the vehicle body, and means connected to the section associated with the member at a point on the opposite side of the member from the pivotal connection between said sections and to the vehicle body, whereby downward tension of said means exerts a lifting action on the pivotal connection between the cover frame sections.

3. In a vehicle top frame, a supporting bow, a cover frame, extending across the arms of the bow without connection therewith and including pivotally connected sections, a link pivotally connected to the supporting bow at a point disposed above the cover frame and to the rear cover frame section at a point spaced from the ends thereof; means connecting the front section to the vehicle body, means connected to the rear section at a point to the rear of the pivotal connection with said link and to the vehicle whereby downward tension of said means exerts a lifting action on the pivotal connection between the cover frame sections, and means connecting the cover frame with the supporting bow to maintain the latter in its erected position.

4. A vehicle top frame comprising a supporting bow pivotally connected to a vehicle body, a cover frame composed of pivotally connected bows extending substantially in a horizontal direction across the arms of the supporting bow without connection therewith, a link pivotally connected to the supporting bow at a point above the cover frame and to the rear bow of the cover frame at a point spaced from the ends thereof, securing means connecting the front bow of the cover frame to the vehicle body, means connecting the vehicle body with the rear cover frame bow at a point to the rear of the pivotal connection of the link, and means connecting the free ends of the several bows whereby the supporting bow is maintained in its erected relation to the cover frame bows.

5. A vehicle top frame comprising a supporting bow having the inner sides of its arms respectively provided with notches, a cover frame formed of pivotally connected U-shaped sections extending between the arms of the supporting bow, the arms of one of the sections of the cover frame being adapted to detachably seat in said notches respectively when the cover frame is in erected relation to the supporting bow, a link having one end pivoted to the supporting bow and its other end to one of the cover frame sections at a point spaced from the pivotal connection between said sections, and means for connecting the sections of the cover frame to a vehicle body.

In testimony whereof I affix my signature in the presence of two witnesses.

GEORGE L. SMITH.

Witnesses:
 DORSEY F. ASBURY,
 FLORENCE A. BLINN.